US011100670B2

(12) United States Patent
Li et al.

(10) Patent No.: US 11,100,670 B2
(45) Date of Patent: Aug. 24, 2021

(54) POSITIONING METHOD, POSITIONING DEVICE AND NONVOLATILE COMPUTER-READABLE STORAGE MEDIUM

(71) Applicant: BOE Technology Group Co., Ltd., Beijing (CN)

(72) Inventors: Yue Li, Beijing (CN); Jingtao Xu, Beijing (CN); Tong Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 23 days.

(21) Appl. No.: 16/635,036

(22) PCT Filed: Jul. 23, 2019

(86) PCT No.: PCT/CN2019/097248
§ 371 (c)(1),
(2) Date: Jan. 29, 2020

(87) PCT Pub. No.: WO2020/024845
PCT Pub. Date: Feb. 6, 2020

(65) Prior Publication Data
US 2020/0380717 A1    Dec. 3, 2020

(30) Foreign Application Priority Data
Aug. 1, 2018 (CN) .......................... 201810862721.1

(51) Int. Cl.
*G06T 7/73* (2017.01)
(52) U.S. Cl.
CPC ...... *G06T 7/73* (2017.01); *G06T 2207/20081* (2013.01); *G06T 2207/30244* (2013.01)

(58) Field of Classification Search
CPC .. G06T 7/30; G06T 7/33; G06T 7/337; G06T 7/38; G06T 7/70; G06T 7/73; G06T 7/74; G06T 7/80; G06T 7/97; G06T 2207/20081; G06T 2207/30244; G06K 9/46; G06K 9/4604; G06N 3/08; G06N 20/00
See application file for complete search history.

(56) References Cited

U.S. PATENT DOCUMENTS

| | | | |
|---|---|---|---|
| 10,659,925 B2 | 5/2020 | Lin et al. | H04W 4/029 |
| 2014/0300637 A1 | 10/2014 | Fan et al. | G06K 9/6201 |
| 2019/0306666 A1 | 10/2019 | Lin et al. | H04W 4/029 |

(Continued)

FOREIGN PATENT DOCUMENTS

| | | |
|---|---|---|
| CN | 106485753 A | 3/2017 |
| CN | 106780699 A | 5/2017 |
| CN | 107438752 A | 12/2017 |

*Primary Examiner* — Andrew W Johns
(74) *Attorney, Agent, or Firm* — Westman, Champlin & Koehler, P.A.

(57) ABSTRACT

The embodiments of the present disclosure provide a positioning method, a positioning device. The method may include: acquiring an image from a camera; obtaining a first coordinate of the camera in a world coordinate system from the image based on a deep learning model; obtaining an initial coordinate of the camera in the world coordinate system based on the first coordinate; and determining a real-time coordinate of the camera in the world coordinate system through inter-frame matching based on the initial coordinate of the camera in the world coordinate system.

15 Claims, 3 Drawing Sheets

(56) References Cited

U.S. PATENT DOCUMENTS

2020/0167695 A1* 5/2020 Buesser et al. ....... G06F 3/0304
2020/0250850 A1* 8/2020 Chakravarty et al. .... G06T 7/74
2021/0082149 A1* 3/2021 Sheorey et al. ....... H04N 13/20

* cited by examiner

POSITIONING METHOD, POSITIONING DEVICE AND NONVOLATILE COMPUTER-READABLE STORAGE MEDIUM

CROSS-REFERENCE TO RELATED APPLICATION(S)

This application is a Section 371 National Stage Application of International Application No. PCT/CN2019/097248, filed on Jul. 23, 2019, which has not yet published, and claims priority to the Chinese Patent Application No. CN201810862721.1, filed on Aug. 1, 2018, entitled "POSITIONING METHOD AND APPARATUS" which is incorporated herein by reference in their entireties.

TECHNICAL FIELD

The present disclosure relates to the field of positioning technology, and more particularly, to a positioning method, a positioning device, and a nonvolatile computer-readable storage medium.

BACKGROUND

Currently, methods for indoor positioning mainly comprise vision-based positioning methods, which mainly comprise Simultaneous Localization And Mapping (SLAM)-based positioning methods and deep learning-based positioning methods.

The vision odometer-based positioning method is an SLAM-based positioning method. In the vision odometer-based positioning method, an initial coordinate of a camera in a world coordinate system needs to be determined in advance, and then positioning is performed by inter-frame matching based on the initial coordinate and a continuous image sequence. In addition, in the vision odometer-based positioning method, it also needs to eliminate a cumulative error every predetermined time.

The scene-based end-to-end positioning method is a deep learning-based positioning method. In the scene-based positioning method, a three-dimensional pose of a camera in a world coordinate system is directly obtained based on a scene of an image from the camera.

SUMMARY

According to an aspect of the present disclosure, there is provided a positioning method, comprising:
  acquiring an image from a camera;
  obtaining a first coordinate of the camera in a world coordinate system from the image based on a deep learning model;
  obtaining an initial coordinate of the camera in the world coordinate system based on the first coordinate; and
  determining a real-time coordinate of the camera in the world coordinate system by inter-frame matching based on the initial coordinate of the camera in the world coordinate system.

In an embodiment, the method further comprises:
  detecting whether a landmark is contained in the image, wherein the landmark has at least three vertices,
  wherein obtaining an initial coordinate of the camera in the world coordinate system based on the first coordinate comprises:
    using the first coordinate as the initial coordinate of the camera in the world coordinate system in response to no landmark being contained in the image; and
    obtaining a second coordinate of the camera in the world coordinate system based on the landmark and the first coordinate in response to a landmark being contained in the image, and using the second coordinate as the initial coordinate of the camera in the world coordinate system.

In an embodiment, obtaining a second coordinate of the camera in the world coordinate system based on the landmark and the first coordinate comprises:
  obtaining coordinates of vertices of the landmark in a camera coordinate system based on the image;
  determining, based on the first coordinate, the coordinates of the vertices of the landmark contained in the image in the world coordinate system from pre-stored coordinates of vertices of a plurality of landmarks in the world coordinate system;
  obtaining a rotation matrix and a translation matrix of the camera coordinate system relative to the world coordinate system based on the coordinates of the vertices of the landmark contained in the image in the camera coordinate system and the coordinates of the vertices of the landmark contained in the image in the world coordinate system; and
  determining the second coordinate of the camera in the world coordinate system based on the rotation matrix and the translation matrix.

In an embodiment, detecting whether a landmark is contained in the image comprises:
  detecting whether the landmark is contained in the image based on a single-shot multi-box detector algorithm.

In an embodiment, the method further comprises:
  updating the initial coordinate of the camera in the world coordinate system at preset time intervals; and
  determining the real-time coordinate of the camera in the world coordinate system by inter-frame matching based on the updated initial coordinate of the camera in the world coordinate system.

In an embodiment, updating the initial coordinate of the camera in the world coordinate system comprises:
  obtaining the initial coordinate of the camera in the world coordinate system based on at least one of a scene and a landmark contained in the image acquired in real time.

In an embodiment, the deep learning model comprises a deep learning model based on a PoseNet network.

According to another aspect of the present disclosure, there is provided a positioning device, comprising:
  one or more processors; and
  a memory coupled to the one or more processor, and having stored thereon computer executable instructions which, when executed by the one or more processors, cause the one or more processors to be configured to:
  acquire an image from a camera;
  obtain a first coordinate of the camera in a world coordinate system from the image based on a deep learning model, and obtain an initial coordinate of the camera in the world coordinate system based on the first coordinate; and
  determine a real-time coordinate of the camera in the world coordinate system by inter-frame matching based on the initial coordinate of the camera in the world coordinate system.

In an embodiment, the processor is further configured to:

detect whether a landmark is contained in the image, wherein the landmark has at least three vertices;

use the first coordinate as the initial coordinate of the camera in the world coordinate system in response to no landmark being contained in the image; and obtain a second coordinate of the camera in the world coordinate system based on the landmark and the first coordinate in response to a landmark being contained in the image, and use the second coordinate as the initial coordinate of the camera in the world coordinate system.

In an embodiment, the processor is further configured to:
obtain coordinates of vertices of the landmark in a camera coordinate system based on the image;

determine, based on the first coordinate, the coordinates of the vertices of the landmark contained in the image in the world coordinate system from pre-stored coordinates of vertices of a plurality of landmarks in the world coordinate system;

obtain a rotation matrix and a translation matrix of the camera coordinate system relative to the world coordinate system based on the coordinates of the vertices of the landmark contained in the image in the camera coordinate system and the coordinates of the vertices of the landmark contained in the image in the world coordinate system; and determine the second coordinate of the camera in the world coordinate system based on the rotation matrix and the translation matrix.

In an embodiment, the processor is further configured to: detect whether the landmark is contained in the image based on a single-shot multi-box detector algorithm.

In an embodiment, the processor is further configured to:
update the initial coordinate of the camera in the world coordinate system at preset time intervals; and determine the real-time coordinate of the camera in the world coordinate system by inter-frame matching based on the updated initial coordinate of the camera in the world coordinate system.

In an embodiment, the processor is further configured to:
obtain the initial coordinate of the camera in the world coordinate system based on at least one of a scene and a landmark contained in the image acquired by the image acquisition module in real time.

In an embodiment, the deep learning model comprises a deep learning model based on a PoseNet network.

According to still another aspect of the present disclosure, there is provided a nonvolatile computer-readable storage medium having stored thereon computer-executable instructions which, when executed by one or more processors, cause the one or more processors to implement the method described above or executed by the processor.

BRIEF DESCRIPTION OF THE ACCOMPANYING DRAWINGS

In order to explain the embodiments of the present disclosure more clearly, the embodiments of the present disclosure will be described in detail below with reference to the accompanying drawings. The embodiments of the present disclosure are intended to explain the present disclosure and should not be construed as limiting the present disclosure. In the accompanying drawings.

Throughout the accompanying drawings, the same or similar reference signs indicate the same or similar elements.

DETAILED DESCRIPTION

The vision odometer-based positioning method is almost unaffected by environmental changes. However, in the vision odometer-based positioning method, the initial coordinate of the camera in the world coordinate system needs to be acquired, and the cumulative error needs to be eliminated every a period of time. However, the acquisition of the initial coordinate of the camera in the world coordinate system and the elimination of the cumulative error need to be implemented using a hardware device such as a WIFI module or Bluetooth etc., which increases additional hardware costs. The scene-based end-to-end positioning method is robust to environmental changes, but has relatively low accuracy of positioning.

One of the purposes of the embodiments of the present disclosure is to provide a positioning method which satisfies the required accuracy of positioning.

The embodiments according to the present disclosure will be described below with reference to the accompanying drawings. It should be illustrated that although the following description is based on a shopping mall with a large environmental change, the embodiments according to the present disclosure may be applied to any other practical application situation with a large environmental change.

Figure 1:
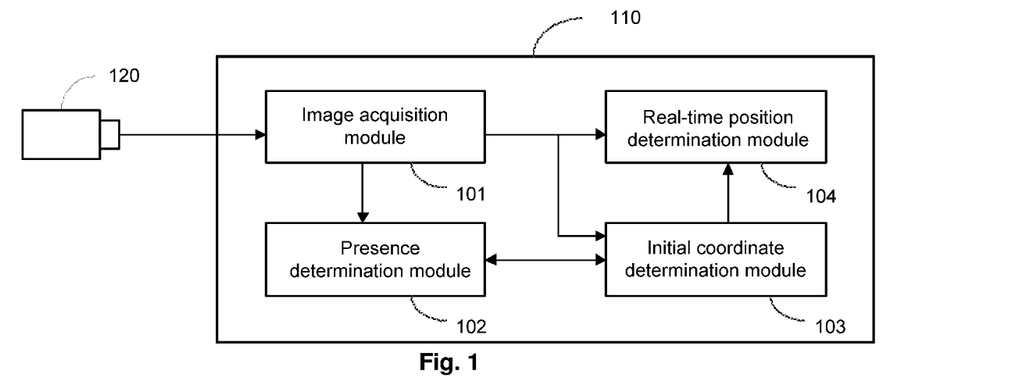
FIG. 1 illustrates a schematic diagram of a positioning device according to an embodiment of the present disclosure.

FIG. 1 illustrates a schematic diagram of a positioning device 110 according to an embodiment of the present disclosure. The positioning device 110 may be coupled to a camera 120. They communicate with each other using wireless technology such as WIFI, Bluetooth, etc. Although the positioning device 110 and the camera 120 are shown as separate devices in FIG. 1, the embodiments according to the present disclosure are not limited thereto, and the positioning device 110 and the camera 120 may be integrated together.

The positioning device may be a processor executable program module of a positioning method, or may also be a positioning device comprising the processor.

The camera 120 is configured to capture an image and transmit the captured image to the positioning device 110. The camera 120 may capture and transmit the image in real time or at preset time intervals. The camera 120 may be any device capable of capturing an image. In practical applications, for example, the camera 120 may be fixed on a shopping cart and move with the shopping cart to capture a plurality of images in a real scene. A position of the camera 120 is essentially that of the shopping cart or a user.

The positioning device 110 is coupled to the camera 120 and is configured to acquire or receive the image from the camera 120. The positioning device 110 may be any positioning device such as a mobile phone, a computer, a server, a netbook etc.

The positioning device 110 may comprise an image acquisition module 101, a presence determination module 102, an initial coordinate determination module 103, and a real-time position determination module 104.

The image acquisition module 101 may be configured to, for example, acquire or receive the image in real time from the camera 120 and transmit the acquired or received image to at least one of the presence determination module 102, the initial coordinate determination module 103 and the real-time position determination module 104.

The presence determination module 102 may be coupled to the image acquisition module 101 and may be configured to determine, for example, whether an initial coordinate of the camera 120 in a world coordinate system is contained in a memory based on the image captured by the camera 120, and transmit a result of the determination to the initial coordinate determination module 103.

The initial coordinate determination module 103 may be coupled to the image acquisition module 101 and the presence determination module 102. The initial coordinate determination module 103 may obtain or receive the image from the image acquisition module 101 and obtain or receive the result of the determination from the presence determination module 102. The initial coordinate determination module 103 may be configured to, in response to determining that the initial coordinate of the camera in the world coordinate system is not contained in the memory, obtain a current coordinate of the camera 120 in the world coordinate system from the acquired current image based on a deep learning model, and obtain the initial coordinate of the camera 120 in the world coordinate system based on the current coordinate. In one embodiment, the current coordinate may be used as the initial coordinate of the camera 120 in the world coordinate system, and may also be used as a current position of the camera 120. The deep learning model may comprise a deep learning model based on a PoseNet network. An input of the PoseNet network may be a RGB image, and an output of the PoseNet network may be a three-dimensional pose of the camera. In order to improve the accuracy of the deep learning model, a real scene may be continuously collected for learning as needed.

After the initial coordinate determination module 103 determines the initial coordinate of the camera 120 in the world coordinate system, the initial coordinate determination module 103 may be configured to store the initial coordinate of the camera 120 in the world coordinate system in the memory, and transmit the initial coordinate to the real-time position determination module 104.

The real-time position determination module 104 may be coupled to the image acquisition module 101 and the initial coordinate determination module 103. The real-time position determination module 104 may obtain or receive the image from the image acquisition module 101 and obtain or receive the stored initial coordinate from the initial coordinate determination module 103. In one embodiment, the real-time position determination module 104 may determine a real-time coordinate of the camera in the world coordinate system by inter-frame matching based on the current initial coordinate of the camera in the world coordinate system which is obtained or received from the initial coordinate determination module 103. Specifically, the real-time position determination module 104 may be configured to continuously receive an image sequence from the image acquisition module 101, and determine the real-time coordinate of the camera in the world coordinate system by inter-frame matching based on the initial coordinate which is obtained or received from the initial coordinate determination module 103. In this process, the initial coordinate of the camera and the coordinate which is obtained in real time may be fused by Kalman filtering, and a result of the fused coordinate may be better than the initial coordinate and the coordinate which is obtained in real time. It should be illustrated that the implementation of obtaining the coordinate of the camera in the world coordinate system from the image based on the deep learning model and determining the real-time coordinate of the camera in the world coordinate system by inter-frame matching based on the initial coordinate of the camera in the world coordinate system may be known from the related art, and will not be described in detail here.

The positioning method according to the embodiments of the present disclosure is completely based on vision without any additional hardware devices such as WiFi and Bluetooth etc., thereby saving hardware costs. In addition, the portions according to the embodiments of the present disclosure are based on a vision odometer, and thus may satisfy relatively high accuracy of positioning.

In one embodiment, the initial coordinate determination module 103 may be further configured to detect whether a landmark is contained in the image, wherein the landmark has at least three vertices. In this case, the initial coordinate determination module 103 may be further configured to, in response to no landmark being contained in the image, use the current coordinate of the camera in the world coordinate system which is obtained from the scene of the image as the initial coordinate of the camera in the world coordinate system; and in response to detecting that the landmark being contained in the image, obtaining another coordinate of the camera in the world coordinate system based on the landmark and the current coordinate of the camera in the world coordinate system which is obtained from the scene of the image, and using the other coordinate as an the initial coordinate of the camera in the world coordinate system.

In one embodiment, obtaining another coordinate of the camera in the world coordinate system based on the landmark and the current coordinate of the camera in the world coordinate system which is obtained from the scene of the image may comprise: obtaining coordinates of vertices of the landmark in a camera coordinate system based on the image; determining, based on the current coordinate of the camera in the world coordinate system which is obtained from the scene of the image, the coordinates of the vertices of the landmark contained in the image in the world coordinate system from pre-stored coordinates of vertices of a plurality of landmarks in the world coordinate system; obtaining a rotation matrix and a translation matrix of the camera coordinate system relative to the world coordinate system based on the coordinates of the vertices of the landmark contained in the image in the camera coordinate system and the coordinates of the vertices of the landmark contained in the image in the world coordinate system; and determining the coordinate of the camera in the world coordinate system based on the rotation matrix and the translation matrix.

In practical applications, the landmarks may be arranged throughout a mall at certain space intervals so that the camera may capture the landmarks from time to time during movement. In one embodiment, the landmark may be in any shape having at least three vertices, such as a triangle, a rectangle, a trapezoid, a diamond, a pentagon, etc. Since the landmark is arranged in advance, the coordinates of each vertex of the landmark in the world coordinate system may be determined in advance, and these coordinates are stored in the memory to determine a real-time position of the camera in the world coordinate system.

In order to explain how to obtain the coordinate of the camera in the world coordinate system based on the landmark, it is assumed that an object has a coordinate (u, v) in a pixel plane coordinate system, a coordinate (Xc, Yc, Zc) in the camera coordinate system, and a coordinate (X, Y, Z) in the world coordinate system, and then a conversion relationship between the camera coordinate system and the world coordinate system is:

$$\begin{bmatrix} Xc \\ Yc \\ Zc \\ 1 \end{bmatrix} = \begin{bmatrix} R & t \\ O^T & 1 \end{bmatrix} \begin{bmatrix} X \\ Y \\ Z \\ 1 \end{bmatrix} \quad \text{Equation (1)}$$

where $R=R_z(\alpha)_y(\beta)R_x(\gamma)$ which is a rotation matrix, wherein $$R_x(\gamma) = \begin{bmatrix} 1 & 0 & 0 \\ 0 & \cos\gamma & -\sin\gamma \\ 0 & \sin\gamma & \cos\gamma \end{bmatrix},$$

$$R_y(\beta) = \begin{bmatrix} \cos\beta & 0 & \sin\beta \\ 0 & 1 & 0 \\ -\sin\beta & 0 & \cos\beta \end{bmatrix}, \text{ and}$$

$$R_z(\alpha) = \begin{bmatrix} \cos\alpha & -\sin\alpha & 0 \\ \sin\alpha & \cos\alpha & 0 \\ 0 & 0 & 1 \end{bmatrix};$$

t=[ΔX, ΔT, ΔZ] which is a three-dimensional translation matrix; and 0=(0, 0, 0). Specifically, R is a rotation matrix of the camera relative to the world coordinate system, α is a yaw angle of rotation of the camera around Z axis of the world coordinate system, β is a pitch angle of the rotation of the camera around Y axis of the world coordinate system, γ is a roll angle of the rotation of the camera around X axis of the world coordinate system, t is a translation of the camera relative to the world coordinate system, ΔZ is a coordinate of the camera on the Z axis of the world coordinate system, ΔX is a coordinate of the camera on the X axis of the world coordinate system, and ΔY is a coordinate of the camera on the Y axis of the world coordinate system.

In one embodiment according to the present disclosure, for example, detecting whether a landmark is contained in the image may comprise detecting whether a landmark is contained in the image based on a Single Shot multi-box Detector (SSD) deep learning algorithm. An input of this algorithm is a RGB image, and an output of this algorithm is a detection box of the detected landmark. The accuracy of this detection may be improved by continuous model training. A landmark may be detected rapidly using the SSD-based target detection method.

When it is detected that a landmark is contained in the image, a background is removed from the image to cut out the detected landmark, and line features are extracted from the detected landmark to obtain each vertex of the landmark, so that a pixel coordinate (ui, vi) of each vertex of the landmark may be solved, wherein i≥3. Further, corresponding depth data of each vertex may be directly obtained by the camera (for example, a binocular camera or a depth camera) itself (based on internal parameters of the camera), and then the coordinate of each vertex of the detected landmark in the camera coordinate system is determined as Pc=(Xc$_i$, Yc$_i$, Zc$_i$) according to a pinhole camera model, wherein i≥3 etc. Thus, a coordinate set of the respective vertices of the landmark in the camera coordinate system may be obtained (wherein since the landmark comprises at least three vertices, the coordinate set comprises at least three coordinates). As described above, the corresponding coordinates P=(X$_i$, Y$_i$, Z$_i$) of the respective vertices of the detected landmark in the world coordinate system are pre-stored in the memory, and therefore are known, wherein i≥3. In addition, since the camera is fixed on a shopping cart, a height ΔZ, a pitch angle β, and a roll angle γ of the camera are also known. In this case, only three parameters which are the yaw angle α, ΔX, and ΔY in the rotation matrix R and the translation matrix T are unknown. As described above, the coordinate of each vertex of the landmark in the camera coordinate system and the corresponding coordinate of the vertex in the world coordinate system have been obtained, a number of the vertices is at least three, and therefore the yaw angle α, ΔX, and ΔY may be solved according to the equation (1). In this case, the rotation matrix R and the translation matrix T may be obtained, so as to obtain the current coordinate of the camera in the world coordinate system.

As described above, coordinates of a plurality of landmarks and their corresponding vertices are pre-stored in the memory. Therefore, when a landmark is detected from the current image, it needs to find the detected landmark from the plurality of landmarks stored in the memory, and then find the coordinates of its corresponding vertices in the world coordinate system. In one embodiment, the current coordinate (Xs, Ys, Zs) of the camera in the world coordinate system may be firstly obtained from the current image through scene-based positioning based on a deep learning model (for example, a PoseNet network). Then, a landmark closest to the coordinate is searched from the memory based on the coordinate (Xs, Ys, Zs) of the camera in the world coordinate system. Since distribution positions of the landmarks are relatively scattered, for example, the landmarks are arranged to be spaced by several tens of meters, there is only one landmark closest to a camera which detects a landmark (that is, there is no case that a landmark is detected and there are two landmarks at the same distance from the detected landmark), and then the coordinate of each vertex of the landmark in the world coordinate system which is pre-stored is found. Since there is a certain error in the scene-based positioning (assuming that a maximum positioning error is d), a coordinate range of the camera obtained based on the scene-based positioning may be (Xs±d, Ys±d, Zs±d). In this case, a landmark in the current image is searched from the memory based on the coordinate range (Xs±d, Ys±d, Zs±d) of the camera, so as to find the pre-stored coordinate of each vertex of the landmark in the world coordinate system.

According to the embodiments of the present disclosure, positioning is performed based on the landmark to determine the initial position of the camera in the world coordinate system. This may further improve the accuracy of positioning.

In one embodiment, the initial coordinate determination module 103 may be further configured to update the initial coordinate of the camera 120 in the world coordinate system at preset time intervals. In this case, the real-time position determination module 104 may be configured to determine the real-time coordinate of the camera in the world coordinate system by inter-frame matching based on the updated initial coordinate of the camera in the world coordinate system. According to the embodiments of the present disclosure, updating the initial coordinate of the camera in the world coordinate system may comprise re-obtaining, by the initial coordinate determination module 103, the initial coordinate of the camera in the world coordinate system based on at least one of a scene and a landmark contained in the image obtained in real time from the image acquisition module 101. Specifically, in the embodiments according to the present disclosure, a timer may be set for the initial coordinate while obtaining the current initial coordinate of the camera in the world coordinate system. The timer (preset time interval) may be, for example, 30 seconds, or any other suitable time. When a time period set by the timer has not passed for the initial coordinate, the stored initial coordinate of the camera in the world coordinate system is kept unchanged, and the real-time coordinate of the camera in the world coordinate system continue to be obtained from the image sequence by inter-frame matching based on the stored initial coordinate. When the time period set by the timer has passed for the initial coordinate, the acquisition of the initial coordinate of the camera in the world coordinate system according to the embodiments of the present disclosure may be triggered again. In one embodiment, the acquisition of the current image and the detection of the landmark in the captured current image may be triggered, and then the current coordinate of the camera in the world coordinate system is determined based on a scene of the current image or the landmark of the current image as described above. Further, the pre-stored initial coordinate of the camera in the world coordinate system is updated or replaced with the determined current coordinate of the camera in the world coordinate system, to use the determined current coordinate of the camera in the world coordinate system as a new initial coordinate of the camera in the world coordinate system, so as to continue to determine the real-time coordinate of the camera in the world coordinate system by inter-frame matching based on the updated initial coordinate of the camera in the world coordinate system. The timer is set again while using the determined current coordinate of the camera in the world coordinate system as a new initial coordinate of the camera in the world coordinate system, and so on.

According to the embodiments of the present disclosure, since the stored initial coordinate of the camera in the world coordinate system is updated at preset time intervals, the cumulative positioning error may be eliminated, thereby further improving the accuracy of positioning.

Figure 2:
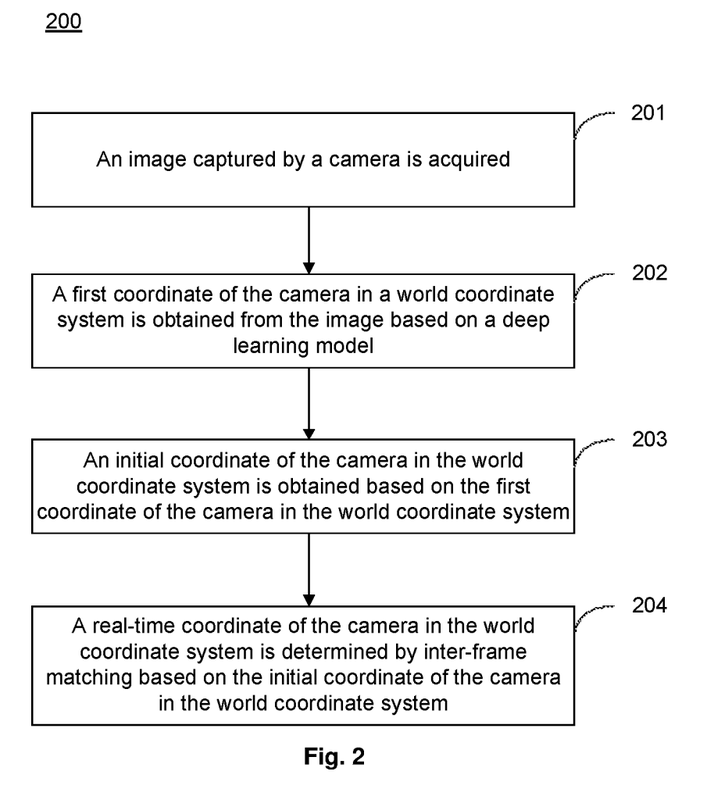
FIG. 2 illustrates a schematic flowchart of a positioning method according to an embodiment of the present disclosure.

FIG. 2 illustrates a schematic flowchart of a positioning method 200 according to an embodiment of the present disclosure. The method 200 may be performed by, for example, the positioning device 110 as shown in FIG. 1.

As shown in FIG. 2, in step 201, an image captured by a camera may be acquired, for example, a current image captured by the camera 120 is received from the camera 120.

In step 202, a first coordinate (i.e., a current coordinate) of the camera in a world coordinate system is obtained from the image (the current image) based on a deep learning model. In one embodiment, the deep learning model comprises a deep learning model based on a PoseNet network.

In step 203, an initial coordinate of the camera in the world coordinate system is obtained based on the first coordinate (the current coordinate) of the camera in the world coordinate system. In one embodiment, the first coordinate (the current coordinate) of the camera in the world coordinate system may be used as the initial coordinate of the camera in the world coordinate system.

In step 204, a current (real-time) coordinate of the camera in the world coordinate system is determined by inter-frame matching based on the initial coordinate of the camera in the world coordinate system. Since then, an image is received repeatedly, and the current (real-time) coordinate of the camera in the world coordinate system is determined by inter-frame matching based on the stored initial coordinate of the camera in the world coordinate system. Obtaining the coordinate of the camera in the world coordinate system by inter-frame matching may be known from the vision odometer-based positioning method, and will not be described in detail here.

In an embodiment, before step 202, the method 200 in FIG. 2 may further comprise a step of determining whether the initial coordinate of the camera in the world coordinate system is contained in the memory. In response to determining that the initial coordinate of the camera in the world coordinate system is contained in the memory, the flow proceeds directly to step 203.

Figure 3:
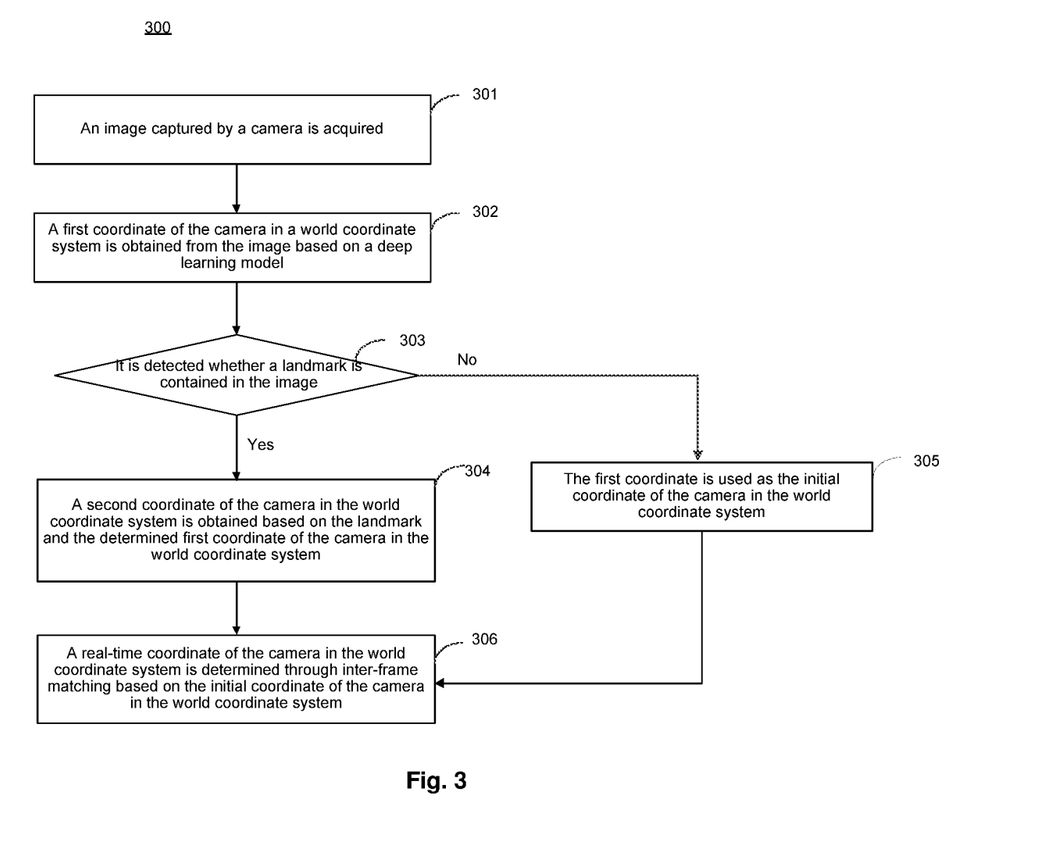
FIG. 3 illustrates a schematic flowchart of a positioning method according to an embodiment of the present disclosure.

FIG. 3 illustrates a schematic flowchart of a positioning method 300 according to an embodiment of the present disclosure. The method 300 may be performed by, for example, the positioning device 110 as shown in FIG. 1.

As shown in FIG. 3, in step 301, an image captured by a camera may be acquired, for example, a current image captured by the camera 120 is received from the camera 120.

In step 302, a first coordinate (i.e., a current coordinate) of the camera in a world coordinate system is obtained from the image (the current image) based on a deep learning model. In one embodiment, the deep learning model comprises a deep learning model based on a PoseNet network.

In step 303, it may be detected whether a landmark is contained in the acquired image. In one embodiment, the landmark has at least three vertices. In one embodiment, in response to detecting that a landmark is contained in the image, step 304 is performed.

In step 304, a second coordinate of the camera in the world coordinate system is obtained as an initial coordinate of the camera in the world coordinate system based on the landmark and the first coordinate (the current coordinate) of the camera in the world coordinate system which is determined in step 302. In one embodiment, coordinates of vertices of the landmark in a camera coordinate system are obtained based on the image. The coordinates of the vertices of the landmark contained in the image in the world coordinate system are determined based on the first coordinate from pre-stored coordinates of vertices of a plurality of landmarks in the world coordinate system. A rotation matrix and a translation matrix of the camera coordinate system relative to the world coordinate system are obtained based on the coordinates of the vertices of the landmark contained in the image in the camera coordinate system and the coordinates of the vertices of the landmark contained in the image in the world coordinate system. A second coordinate of the camera in the world coordinate system is determined based on the rotation matrix and the translation matrix.

In one embodiment, in response to detecting that no landmark is contained in the image, step 305 is performed. In step 305, the first coordinate (the current coordinate) of the camera in the world coordinate system obtained from the acquired image is directly used as the initial coordinate of the camera in the world coordinate system.

In step 306, a real-time coordinate of the camera in the world coordinate system is determined by inter-frame matching based on the initial coordinate of the camera in the world coordinate system. In an embodiment, the method 300 may further comprise, in response to determining that the initial coordinate of the camera in the world coordinate system is contained in the memory, determining whether a preset time period has passed for the initial coordinate. Further, in response to determining that the preset time period has not passed for the initial coordinate, the real-time coordinate of the camera is determined by inter-frame matching based on the current initial coordinate. In response to determining that the preset time period has passed for the initial coordinate, step 301 is performed. That is, the initial coordinate of the camera in the world coordinate system is updated based on a scene of the image or the landmark of the image by determining whether the landmark is contained in the image, so as to determine the real-time coordinate of the camera in the world coordinate system by inter-frame matching based on the updated initial coordinate of the camera in the world coordinate system. The initial coordinate of the camera in the world coordinate system is continuously updated at preset time intervals, and the real-time coordinate of the camera in the world coordinate system is determined by inter-frame matching based on the updated initial coordinate of the camera in the world coordinate system. Updating the initial coordinate of the camera in the world coordinate system may comprise performing the method 300 once.

Figure 4:
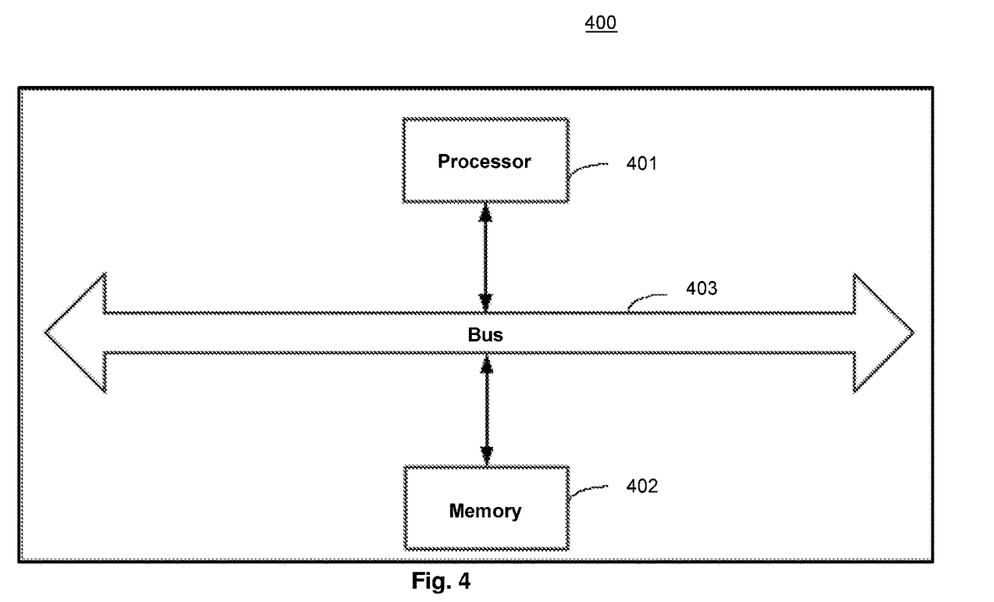
FIG. 4 illustrates a schematic diagram of a positioning device according to an embodiment of the present disclosure.

FIG. 4 illustrates a schematic diagram of a positioning device 400 according to an embodiment of the present disclosure.

As shown in FIG. 4, the positioning device 400 may be used to implement the method according to the embodiments of the present application, at least the method shown in FIG. 2 or FIG. 3. The positioning device 400 is only one example of a suitable positioning device and is not intended to suggest any limitation on a scope of use or functionality of the subject matter which is currently disclosed.

Components of the positioning device 400 may comprise, but are not limited to, a processor 401, a memory 402, and a bus 403 which couples various system components comprising the memory to the processor 401. The bus 403 may be any of several types of bus structures comprising a memory bus or a memory controller, a peripheral bus, and a local bus using any of a variety of bus architectures. By way of example without limitation, such architectures comprise an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus also known as a mezzanine bus.

The positioning device 400 may comprise a variety of computer-readable media. The computer-readable media may be any available media which may be accessed by the positioning device 400 and comprise nonvolatile media and removable and non-removable media. By way of example without limitation, the computer-readable media may comprise computer-readable storage media and communication media. The computer-readable storage media comprise volatile and non-volatile and removable and non-removable media which are implemented using a method or technique for storing information such as computer readable instructions, data structures, program modules or other data etc. The computer-readable storage media comprise, but are not limited to: a Random Access Memory (RAM), a Read-Only Memory (ROM), an EEPROM, a flash memory or other memory technologies, a CD-ROM, a Digital Versatile Disk (DVD) or other optical disk memories, cartridges tapes, magnetic tapes, magnetic disk storage devices, or other magnetic storage devices, or any other medium which may be used to store desired information and may be accessed by the positioning device 400. The communication media typically embody the computer-readable instructions, the data structures, the program modules, or the other data in a modulated data signal such as a carrier wave or other transmission mechanism etc., and comprise any information delivery media. The term "modulated data signal" means a signal which has one or more of its characteristics set or changed in such a manner that information is encoded in the signal. By way of example without limitation, the communication media comprise wired media such as a wired network or direct-wired connection etc., and wireless media such as RF and other wireless media. Combinations of any of the above are also included within the scope of the computer-readable media.

The memory 402 may comprise computer storage media in a form of volatile and/or non-volatile memory such as a ROM and a RAM etc. A Basic Input/Output System (BIOS) containing basic routines which, for example, help to transfer information between elements within the positioning device 400 during startup, is typically stored in the ROM. The RAM typically contains data and/or program modules which are immediately accessible to the processor 401 and/or are currently being manipulated by the processor 401. By way of example without limitation, the data which may be stored in the memory 402 shown in FIG. 4 may comprise a BIOS, an operating system, an application program, other program modules, and program data.

The positioning device 400 may also comprise other removable/non-removable and volatile/nonvolatile computer storage media.

Other removable/non-removable and volatile/non-volatile computer storage media which may be used in an exemplary operating environment comprise, but are not limited to, a cartridge, a flash card, a DVD, a digital video tape, a solid-state RAM, a solid-state ROM, etc.

The computer storage medium discussed above provides the positioning device 400 with storage for computer-executable instructions, data structures, program modules, and other data.

The user may input commands and information into the pointing device 400 through input devices such as a keyboard and a pointing device commonly referred to as a mouse, a trackball, or a touchpad. Other input devices may comprise a microphone, a joystick, a game pad, a satellite dish, a scanner, etc. These and other input devices are typically connected to the processor 401 through a user Input/Output (I/O) interface 14 coupled to the bus 403. A monitor or other types of display devices may be connected to the bus 403 through the user Input/Output (I/O) interface 14 such as a video interface. In addition to the monitor, the positioning device 400 may also be connected to other peripheral output devices, such as a speaker and a printer, through the user Input/Output (I/O) interface 14.

The positioning device 400 may be connected to one or more remote computers through a network interface 15. The remote computer may be a personal computer, a server, a router, a network PC, a peer-to-peer device, or other common network nodes, and typically comprises many or all of the elements described above with respect to the positioning device 400.

The embodiments of the present disclosure further provide a computer-readable storage medium having computer-executable instructions stored thereon. The computer instructions, when executed on one or more processors, cause the one or more processors to implement the method and functions according to the embodiments of the present disclosure. The computer-readable medium may comprise any of the computer-readable media described above.

The embodiments of the present disclosure further provide a computer program product. When instructions in the above computer program product are executed by a processor, the method according to the embodiments of the present disclosure may be implemented.

In the description of the present specification, the description of the terms "one embodiment", "some embodiments", "an example", "a specific example", or "some examples" etc. means that a specific feature, structure, material or characteristics described in conjunction with the embodiment or example is included in at least one embodiment or example of the present disclosure. In the present specification, schematic expressions of the above terms do not necessarily have to refer to the same embodiment or example. Furthermore, the specific feature, structure, material, or characteristics described may be combined in any suitable manner in any one or more embodiments or examples. In addition, those skilled in the art can combine and merge different embodiments or examples described in the present specification and features in different embodiments or examples without conflicting with each other.

Furthermore, the terms "first" and "second" are used for descriptive purposes only, and are not to be construed as indicating or implying relative importance or implicitly indicating a number of indicated technical features. Thus, features defined by "first" and "second" may explicitly or implicitly include at least one of the features. In the description of the present disclosure, "plurality" means at least two, such as two, three, etc., unless explicitly and specifically defined otherwise.

Any process or method described in the flowcharts or described elsewhere herein may be construed as meaning modules, sections, or portions including codes of executable instructions of one or more steps for implementing a custom logic function or process. Further, the scope of the implementations of the present disclosure includes additional implementations in which functions may be performed in a substantially simultaneous manner or in a reverse order, depending on the functions involved, instead of the order shown or discussed, which should be understood by those skilled in the art to which the embodiments of the present disclosure pertain.

A logic and/or steps represented in the flowcharts or otherwise described herein, for example, may be considered as a sequence listing of executable instructions for implementing logical functions, and may be embodied in any computer-readable medium for use by an instruction execution system, apparatus or device (for example, a computer-based system, a system including a processor or other systems which may obtain instructions from the instruction execution system, apparatus or device and may execute the instructions), or may be used in combination with the instruction execution system, apparatus or device. As for this specification, a "computer-readable medium" may be any means which may contain, store, communicate, propagate, or transmit programs for use by or in connection with the instruction execution system, apparatus, or device. More specific examples of the computer-readable media may include, for example, an electrical connection part (an electronic apparatus) having one or more wirings, a portable computer disk cartridge (a magnetic apparatus), a Random Access Memory (RAM), a Read Only Memory (ROM), an Erasable and Programmable Read Only Memory (an EPROM) or a flash memory, a fiber optic apparatus, and a portable Compact Disc-Read Only Memory (CD-ROM). In addition, the computer-readable media may even be paper or other suitable medium on which the programs may be printed, as the programs may be obtained electronically by optically scanning the paper or the other medium and then editing, interpreting, or performing other suitable processing (if necessary) on the paper or the other medium, and then the programs are stored in a computer memory.

It should be understood that portions of the present disclosure may be implemented in hardware, software, firmware, or a combination thereof. In the above embodiments, a plurality of steps or methods may be implemented using software or firmware stored in a memory and executed by a suitable instruction execution system. For example, if implemented in hardware, it can be implemented using any one or a combination of the following techniques known in the art: discrete logic gates having logic gate circuits for implementing logic functions on data signals, an application-specific integrated circuit having a suitable combinational logic gate circuit, a Programmable Gate Array (PGA), a Field Programmable Gate Array (FPGA), etc.

It can be understood by those of ordinary skill in the art that all or a part of steps for implementing the method according to the embodiments may be completed by programs instructing a related hardware. The programs may be stored in a computer-readable storage medium. When executed, the programs include one or a combination of the steps for implementing the method embodiments.

In addition, various functional units in various embodiments of the present disclosure may be integrated in one processing module, or may exist alone physically, or two or more units may be integrated in one module. The integrated module may be implemented in a form of hardware or in a form of a software functional module. The integrated module may also be stored in a computer readable storage medium if it is implemented in a form of a software functional module and sold or used as an independent product.

Although the embodiments of the present disclosure have been illustrated and described above, it can be understood that the above embodiments are exemplary and should not be to be construed as limiting the scope of the disclosure. Changes, modifications and substitutions can be made to the above embodiments by those of ordinary skill in the art within the scope of the present disclosure.

We claim:

1. A positioning method, comprising:
acquiring an image from a camera;
obtaining a first coordinate of the camera in a world coordinate system from the image based on a deep learning model;
obtaining an initial coordinate of the camera in the world coordinate system based on the first coordinate; and
determining a real-time coordinate of the camera in the world coordinate system by inter-frame matching based on the initial coordinate of the camera in the world coordinate system.

2. The method according to claim 1, further comprising:
detecting whether a landmark is contained in the image, wherein the landmark has at least three vertices,
wherein obtaining an initial coordinate of the camera in the world coordinate system based on the first coordinate comprises:
using the first coordinate as the initial coordinate of the camera in the world coordinate system in response to no landmark being contained in the image; and
obtaining a second coordinate of the camera in the world coordinate system based on the landmark and the first coordinate in response to a landmark being contained in the image, and
using the second coordinate as the initial coordinate of the camera in the world coordinate system.

3. The method according to claim 2, wherein obtaining a second coordinate of the camera in the world coordinate system based on the landmark and the first coordinate comprises:
- obtaining coordinates of vertices of the landmark in a camera coordinate system based on the image;
- determining, based on the first coordinate, the coordinates of the vertices of the landmark contained in the image in the world coordinate system from pre-stored coordinates of vertices of a plurality of landmarks in the world coordinate system;
- obtaining a rotation matrix and a translation matrix of the camera coordinate system relative to the world coordinate system based on the coordinates of the vertices of the landmark contained in the image in the camera coordinate system and the coordinates of the vertices of the landmark contained in the image in the world coordinate system; and
- determining the second coordinate of the camera in the world coordinate system based on the rotation matrix and the translation matrix.

4. The method according to claim 2, wherein detecting whether a landmark is contained in the image comprises:
- detecting whether the landmark is contained in the image based on a single-shot multi-box detector algorithm.

5. The method according to claim 2, further comprising:
- updating the initial coordinate of the camera in the world coordinate system at preset time intervals; and
- determining the real-time coordinate of the camera in the world coordinate system by inter-frame matching based on the updated initial coordinate of the camera in the world coordinate system.

6. The method according to claim 5, wherein updating the initial coordinate of the camera in the world coordinate system comprises:
- obtaining the initial coordinate of the camera in the world coordinate system based on at least one of a scene and a landmark contained in the image acquired in real time.

7. The method according to claim 1, wherein the deep learning model comprises a deep learning model based on a PoseNet network.

8. A nonvolatile computer-readable storage medium having stored thereon computer-executable instructions which, when executed by one or more processors, cause the one or more processors to implement the method according to claim 1.

9. A positioning device, comprising:
- one or more processors; and
- a memory coupled to the one or more processors and having stored thereon computer executable instructions which, when executed by the one or more processors, cause the one or more processors to be configured to:
- acquire an image from a camera;
- obtain a first coordinate of the camera in a world coordinate system from the image based on a deep learning model, and obtain an initial coordinate of the camera in the world coordinate system based on the first coordinate; and
- determine a real-time coordinate of the camera in the world coordinate system by inter-frame matching based on the initial coordinate of the camera in the world coordinate system.

10. The device according to claim 9, wherein the processor is further configured to:
- detect whether a landmark is contained in the image, wherein the landmark has at least three vertices; and
- use the first coordinate as the initial coordinate of the camera in the world coordinate system in response to no landmark being contained in the image; or
- obtain a second coordinate of the camera in the world coordinate system based on the landmark and the first coordinate in response to a landmark being contained in the image, and
- use the second coordinate as the initial coordinate of the camera in the world coordinate system.

11. The device according to claim 10, wherein the processor is further configured to:
- obtain coordinates of vertices of the landmark in a camera coordinate system based on the image;
- determine, based on the first coordinate, the coordinates of the vertices of the landmark contained in the image in the world coordinate system from pre-stored coordinates of vertices of a plurality of landmarks in the world coordinate system;
- obtain a rotation matrix and a translation matrix of the camera coordinate system relative to the world coordinate system based on the coordinates of the vertices of the landmark contained in the image in the camera coordinate system and the coordinates of the vertices of the landmark contained in the image in the world coordinate system; and
- determine the second coordinate of the camera in the world coordinate system based on the rotation matrix and the translation matrix.

12. The device according to claim 10, wherein the processor is further configured to: detect whether the landmark is contained in the image based on a single-shot multi-box detector algorithm.

13. The device according to claim 10, wherein the processor is further configured to:
- update the initial coordinate of the camera in the world coordinate system at preset time intervals; and
- determine the real-time coordinate of the camera in the world coordinate system by inter-frame matching based on the updated initial coordinate of the camera in the world coordinate system.

14. The device according to claim 13, wherein the processor is further configured to:
- obtain the initial coordinate of the camera in the world coordinate system based on at least one of a scene and a landmark contained in the image acquired by the image acquisition module in real time.

15. The device according to claim 9, wherein the deep learning model comprises a deep learning model based on a PoseNet network.

* * * * *